Jan. 3, 1961 S. L. WILLIAMS 2,966,963
BRAKE RIGGING FOR RAILWAY CAR TRUCKS
Filed Feb. 25, 1959 2 Sheets-Sheet 1

INVENTOR.
Samuel L. Williams
BY
Adelbert A. Steinmiller
Attorney

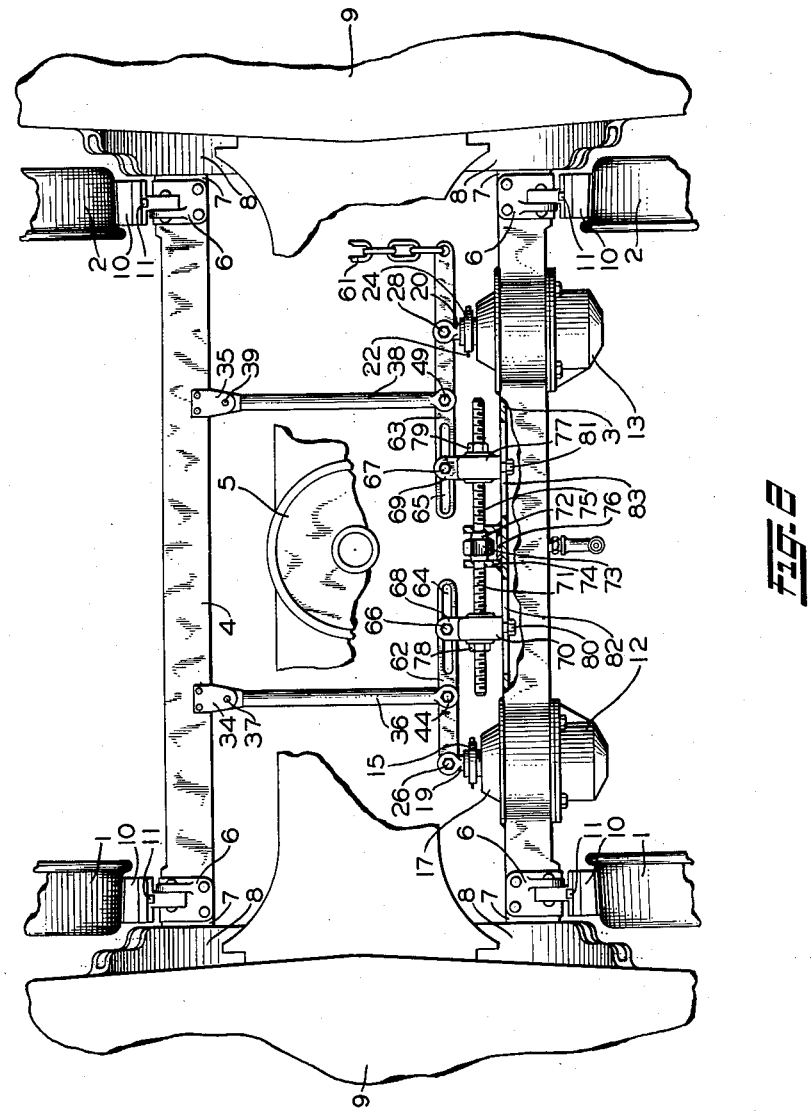

2,966,963
Patented Jan. 3, 1961

United States Patent Office

2,966,963
BRAKE RIGGING FOR RAILWAY CAR TRUCKS

Samuel L. Williams, Pittsburgh, Pa., assignor to Westinghouse Air Brake Company, Wilmerding, Pa., a corporation of Pennsylvania Filed Feb. 25, 1959, Ser. No. 795,490

12 Claims. (Cl. 188—52)

This invention relates to brake rigging for railway car trucks and particularly to railway car truck brake rigging of the recently proposed type in which brake cylinders are carried directly on the brake beams and force them apart to produce a brake application on the wheels of the car truck.

Several forms of the above-mentioned recently proposed railway car truck brake rigging are disclosed and claimed in the copending United States patent application Serial No. 682,181 of George K. Newell, filed September 5, 1957, and assigned to the assignee of this application. One form of this type of brake rigging comprises an arrangement in which the cylinder body of each of a plurality of brake cylinders is attached to one of a pair of brake beams on a car truck with the free end of the piston rod of each cylinder connected to a point on the other brake beam directly opposite so that the brake beams are moved apart to effect application of the brake shoes carried by the brake beams to the tread of the car wheels upon the supply of fluid under pressure to the brake cylinders. Upon release of fluid under pressure from the brake cylinders, the brake beams are moved toward each other to correspondingly move the brake shoes away from the car wheels and thereby effect release of the brake application by the force of release springs in the brake cylinders.

It is a characteristic of the aforesaid type of car truck brake rigging that the braking force exerted by the brake cylinders can be suited to cars having different empty or tare weights only by using brake cylinders of different size correspondingly proportioned to the empty weight of the particular car. This makes it necessary for the user railroad to carry several different sizes of brake cylinders in stock for replacements.

Accordingly, in order to enable the use of one standard or uniform size of brake cylinder with the brake rigging of the type disclosed in the hereinbefore-mentioned copending application, when this type of rigging is applied to freight cars having different empty or tare weights, it is the general purpose of this invention to provide for use in such type of brake rigging of a standard size of brake cylinder, for all weights of cars, by lever means which is manually preadjusted and effective to cause the brake cylinders to exert a braking force on a car variable in correspondence with the empty or tare weight of the car.

More specifically, the invention comprises a variable force-multiplication lever for each brake cylinder of the aforementioned recently proposed brake rigging, which lever is pivotally attached at one end to the brake beam carrying the brake cylinder and at the other end to the brake cylinder piston rod, and a force transmitting rod for each brake cylinder, the rod being pivotally connected at one end to a point on the corresponding lever intermediate the ends thereof and at the other end to a point on the other brake beam substantially opposite the brake cylinder. In one form of the invention, the lever is provided with a plurality of holes in spaced relation by which the point of connection of the rod to the lever may be manually selectively adjusted. In a second form of the invention, an adjustable fulcrum member is provided on the brake beam for each lever and means is provided for manually simultaneously adjusting all fulcrum members to correspondingly adjust the leverage ratio of the lever and thus the braking force exerted by the brake cylinder for any given fluid pressure supplied thereto.

It should be understood that the present invention is not a variable load brake apparatus in the sense that the degree of braking is varied in accordance with the weight of the lading or "pay load" placed on the car. As distinguished from such a variable load brake equipment, the brake rigging of the present invention, when once adjusted for the particular empty or tare weight of a freight car, is not thereafter changed notwithstanding a change in the weight of the lading or "pay load" carried by the car.

In the accompanying drawings:

Fig. 2 is a plan view, partially in section, of a brake rigging for a four-wheel car truck, which rigging embodies another form of the invention.

Fig. 1

Figure 1:
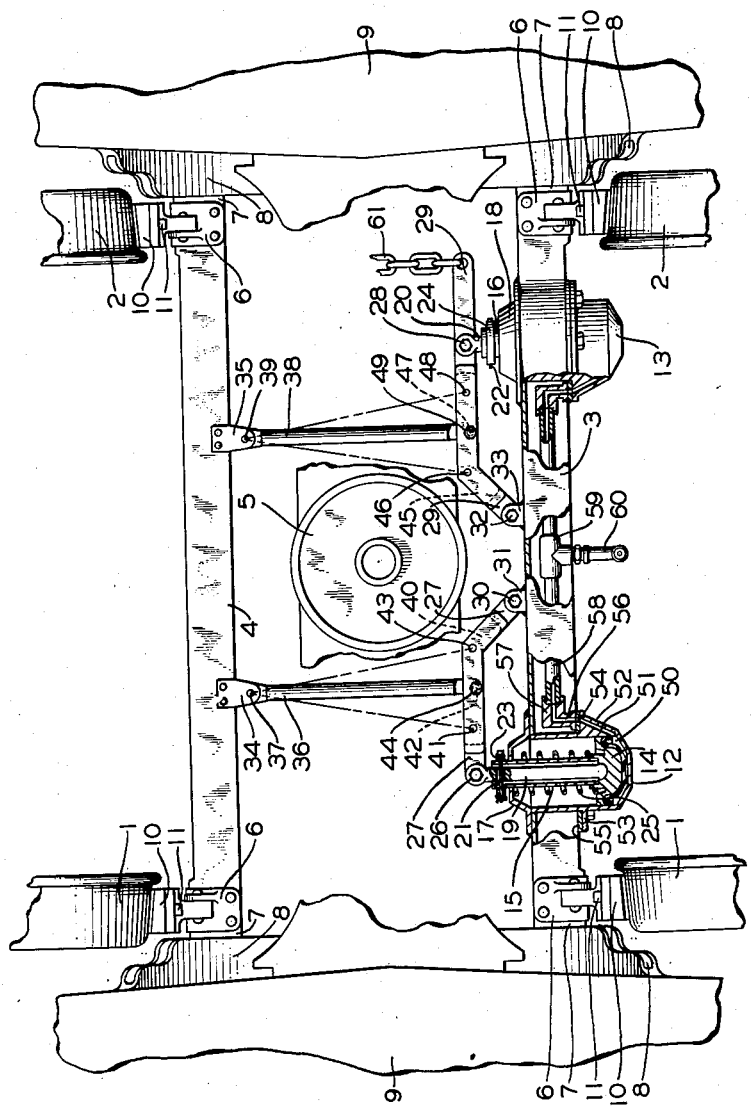
Fig. 1 is a plan view, partially in section, of a brake rigging for a four-wheel (that is, two axle) car truck, which rigging embodies one form of the invention.

Referring to Fig. 1 of the drawings, the reference numerals 1 and 2 designate respectively, the wheels secured at corresponding ends of each of two axles of a two-axle four-wheel railway car truck.

The brake rigging shown in Fig. 1 comprises a pair of brake beams 3 and 4 extending crosswise of the car truck and in parallel spaced relation to each other and to a truck bolster 5. The brake beams 3 and 4 are symmetrically arranged on opposite sides of the truck bolster 5 and are movably supported at each end on the side frame members of the truck in the manner hereinafter described.

The brake beams 3 and 4 each have the shape of a standard channel, such as a U-channel. Brake beam 3 may be further constructed, as described in detail in the hereinbefore-mentioned copending patent application, to provide a support for a pair of brake cylinders.

A brake head 6 is riveted or otherwise attached to each end of each of the brake beams 3 and 4 adjacent to and on the inboard side of a guide foot 7. Each foot 7 is a flat L-shaped metal member, one leg of which extends between the flanges of the brake beam and is suitably secured thereto. The other leg of each guide foot 7 is slideably supported in a grooved wear plate and guide member 8. The wear plate and guide member 8 is secured to a truck side frame 9. The wear plate and guide members and guide feet serve to support the brake beams 3 and 4 at the proper height above the rails (that is somewhat below the horizontal diameter of the wheels). The groove in the wear plate and guide member 8 is disposed at a slight angle to the horizontal to permit bodily movement of the brake beams in a direction radially of the associated wheels when a brake application is made.

Each brake head 6 carries a composition brake shoe 10 for contact with the tread of an associated wheel. In customary manner the shoe has a backing plate provided with a key bridge to receive a key 11 for removably locking the shoe to the brake head 6.

The brake shoes 10 are operated into and out of contact with their associated wheels 1, 2 by means of a pair of identical fluid pressure motors or brake cylinders 12 and 13. The brake cylinders 12 and 13 are secured to the brake beam 3 in any suitable manner, one form of which is fully described in detail and claimed in the hereinbefore-mentioned copending patent application of George K. Newell.

The body of each of the brake cylinders 12 and 13 has a bore in which a piston 14 (only one of which is shown) is slidably operable. A pair of hollow rods 15 and 16, one secured coaxially to each of the pistons, projects through a bore in each of a pair of nonpressure heads 17 and 18 associated respectively, with the brake cylinders 12 and 13 and secured, as by welding, to the web side of the U-channel constituting the brake beam 3. The hollow rods 15 and 16 are adapted to receive one end respectively, of one of a pair of push rods 19 and 20, the opposite ends of which are each provided with a clevis. One of a pair of push rod holder pins 21 and 22 extends respectively, diametrically through one of a pair of reinforcing ring flanges 23 and 24 attached respectively to the free or outside ends of the hollow rods 15 and 16 and through one of the push rods 19 and 20 to connect the push rods to the hollow rods to insure that these members are moved together to a brake release position, in which they are shown in Fig. 1 by one of a pair of springs 25, only one of which is shown, interposed respectively, between one of the pistons 14, only one of which is shown, and the nonpressure heads 17 and 18.

The clevis on the push rod 19 is pivotally connected, as by a pin 26, to the left-hand end of a first curved lever 27, and the clevis on the push rod 20 is pivotally connected, as by a pin 28, to a second curved lever 29 intermediate its ends. The right-hand end of the first curved lever 27 is pivotally connected, as by a pin 30, to a first clevis 31 secured, as by riveting or welding, to the web of the U-channel constituting the brake beam 3. The left-hand end of the second curved lever 29 is pivotally connected, as by a pin 32, to a second clevis 33 also secured, as by riveting or welding, to the web of the U-channel constituting the brake beam 3.

Secured to the brake beam 4, as by riveting or welding, is a pair of spaced-apart clevises 34 and 35. One end of a first connecting rod 36 is pivotally connected as by a pin 37, to the clevis 34, and a corresponding end of a second connecting rod 38 is pivotally connected, as by a pin 39, to the clevis 35.

The first curved lever 27 is provided intermediate its ends with an elongated slot 40. The lever 27 is further provided with three bores 41, 42 and 43 which extend therethrough in intersecting relation to the slot 40. The centers of the bores 41, 42 and 43 are equally spaced apart along an arc, the center of which coincides with the center of the pin 37 that secures one end of the rod 36 to the clevis 34 carried by the brake beam 4. The opposite end of the rod 36 is disposed in the slot 40 and may be selectively pivotally connected, as by a pin 44, to the curved lever 27 in any one of three positions determined by the bores 41, 42 and 43, accordingly as the empty or tare weight of a freight car is light, medium or heavy. By thus varying the location of the pivotal connection between the curved lever 27 and the rod 36, and consequently the length of the lever arm extending between the pins 30 and 44, the amount of thrust or braking force transmitted from the push rod 19 to the brake beam 4, and consequently to the wheels of the car truck, can correspondingly be varied.

As shown in Fig. 1, the rod 36 is disposed in the slot 40 in a position to provide for the pin 44 to connect the rod 36 to the curved lever 27 by passing through the bore 42 in the lever 27. When the rod 36 is thus connected to the curved lever 27, the braking force transmitted to the wheels will be that required for a medium weight (tare or empty weight) car.

The second curved lever 29 is similarly provided with a slot 45 and three bores 46, 47 and 48 which extend therethrough in intersecting relation to the slot. The centers of the bores 46, 47 and 48 are equally spaced apart along an arc the center of which coincides with the center of the pin 39 that secures one end of the rod 38 to the clevis 35 carried by the brake beam 4. The opposite end of the rod 38 is disposed in the slot 45 and may be selectively pivotally connected, as by a pin 49, to the curved lever 29 in any one of three positions determined by the bores 46, 47 and 48, accordingly as the empty or tare weight of a freight car is light, medium or heavy. Likewise, by varying the location of the pivotal connection between the curved lever 29 and the rod 38, the amount of thrust or braking force transmitted from the push rod 20 to the brake beam 4, and consequently to the wheels of the car truck, can correspondingly be varied.

Formed on a packing cup secured to the piston 14 are several lugs which, when the piston 14 occupies the position in which it is shown in Fig. 1, contact the end wall or pressure head of the cylinder 12 to form between the piston and the closed end of the cylinder a pressure chamber 50 to which fluid under pressure may be supplied through a passageway 51 formed in a rib 52 extending outwardly from the periphery of the body of the cylinder 12 and formed integral therewith. The passageway 51 opens at the contact face of a flange 53 and registers with a port 54 in an annular ring 55 that is secured, as by welding, to the free edges of the extruded circularly formed flanges of the U-channel constituting the brake beam 3, as described in the aforementioned copending patent application of George K. Newell. The port 54 in turn registers with a passageway 56 formed in an elbow fitting 57 secured to the inside surface of the annular ring 55. A pipe or conduit 58 having screw-threaded or other means of attachment with the elbow fitting 57 may be connected through a pipe T 59 and a flexible hose 60 to the brake cylinder pipe leading from the usual brake controlling valve device of the air brake system on railway freight cars. Fluid under pressure supplied to pressure chambers 50 through hose 60, pipe T 59, pipes 58, passageways 56, ports 54 and passageways 51 causes movement of the cylinders 12 and 13 and brake beam 3 in one direction, and the pistons 14, push rods 19 and 20, and, through the intermediary of curved levers 27 and 29, and rods 36 and 38, brake beam 4 in the opposite direction to effect braking contact of the brake shoes 10, carried by the beams 3 and 4, with the tread of their respectively associated wheels.

In order to provide in customary fashion for operation of the brake beams by hand brake means, one end of a chain 61 is secured to the right-hand end of the curved lever 29. The chain passes over or around a system of pulleys (not shown) and has its other end connected to the customary hand brake wheel which is located at one end of the freight car.

In operation, when it is desired to effect a brake application and the rods 36 and 38 are connected to the respective curved levers 27 and 29 as shown in Fig. 1, fluid under pressure is admitted simultaneously to the pressure chamber 50 in each of the cylinders 12 and 13, through the flexible hose 60, which is connected to the brake controlling valve device of the usual air brake system on railway freight cars, pipe T 59, pipes 58, passageways 56, ports 54, and passageways 51. Fluid under pressure thus supplied to the chambers 50 formed between the pistons 14 and the closed end or pressure head of each of the brake cylinders 12 and 13 is effective to move the pistons 14 and the cylinders 12 and 13 in opposite directions. As the pistons 14 and cylinders 12 and 13 are moved in opposite directions, the brake beams 3 and 4 also move in opposite directions since the pistons 14 are connected to the brake beam 4 through the push rods 19 and 20, curved levers 27 and 29 and rods 36 and 38 respectively, and the cylinders 12 and 13 are carried by brake beams 3. This is apparent since each push rod is connected to one end of one curved lever which has its opposite end fulcrumed on a pin carried by a clevis secured to the brake beam, and one end of each rod is connected to one curved lever intermediate the fulcrum of the lever and the connection of the push rod to the lever.

When the parts of the brake rigging occupy the position in which they are shown in Fig. 1, the thrust or force transmitted through the rods 36 and 38 to the brake beam 4 varies inversely with the distance between the center of the pin connecting the respective rod to its respective curved lever, and the center of the pin (fulcrum) connecting the respective curved lever to the brake beam 3, since the product of this force (or its horizontal component, if the rod is connected to the curved lever at either of the other two points of connection) and its lever arm must equal the product of the force applied to each push rod by its respective piston and its lever arm the length of which is not effected by changing the point of connection of the rod to the curved lever.

As the brake beams move in opposite directions, the brake shoes 10 carried by the beams are brought into braking contact with the wheels of the truck to effect a braking action on the wheels.

As the brake beams 3 and 4 are moved as described above, these beams are supported and guided by the guide feet 7 as these feet have sliding contact in the groove in the wear plate and guide members 8. As hereinbefore mentioned, the orientation of the wear plate and guide members 8 is such that the brake beams 3 and 4, and the brake shoes 10 carried thereby, are moved radially toward the wheels.

It will be understood that in view of the symmetrical disposition of the brake cylinders on one brake beam on opposite sides of the longitudinal axis of the truck and the corresponding symmetrical relation of the points at which the rods 36 and 38 are anchored to the other brake beam, the simultaneous supply of fluid at the same pressure to the pressure chamber 50 of both brake cylinders 12 and 13 produces substantially equalized forces of application of the brake shoes to the wheels.

When it is desired to release the brake application, the fluid under pressure supplied to the chambers 50 of both brake cylinders 12 and 13 is vented in the usual manner to atmosphere through the passageways 51, ports 54, passageways 56, pipes 58, pipe T 59, and the flexible hose 60 to the brake controlling valve device of the car brake system, whereupon the force of each spring 25 acting respectively on the non-pressure heads 17 and 18 moves corresponding brake cylinders 12 and 13 and their respective pistons 14 in a brake releasing direction to move the brake beams toward each other and the brake shoes correspondingly away from the tread surface of the wheels of the truck to effect a brake release.

Due to the inclination of the grooves in the wear plate and guide members 8, the brake beams tend to return by action of gravity to their normal symmetrical relation with respect to the truck bolster, in which position the clearance between the brake shoes on one brake beam and their associated wheels is substantially equal to the clearance between the brake shoes on the other brake beam and their associated wheels. However, due to the predominating weight of brake beam 3, which carries two brake cylinders 12 and 13 over the weight of brake beam 4 which carries no brake cylinder, the tendency is for brake beam 3 to travel by action of gravity, upon release of air from the brake cylinders 12 and 13, further down the inclined groove of the wear plate and guide members 8 and thus past the normal intended release position. In order to limit the travel of the heavier of the two brake beams toward its release position, each wear plate and guide member 8 is so positioned that the bottom or closed end of the groove therein serves as a limit stop to movement of the guide foot 7 toward the bolster 5.

It will be noted that it is not necessary to use a slack adjuster with this type of rigging. Since there is only one link and one lever between each of the brake cylinders and the brake beams of the present invention, there can be little or no wear therein which must be compensated for by a slack adjuster as in conventional brake rigging. It should be understood that the length of the bore in the casing of cylinders 12 and 13 is such as to provide sufficient travel for the pistons 14 in addition to that required to effect contact of the brake shoes with the wheel treads, that as the brake shoes 10 wear away, the shoes are always properly moved into braking contact with the wheels of the truck during each brake application throughout their useful life without the necessity of a slack adjuster to compensate for wear of the shoes.

*Fig. 2*

According to a second embodiment of the invention, as shown in Fig. 2, the push rod 19 and the first rod 36, and the push rod 20 and the second rod 38, shown in Fig. 1, are connected respectively to a lever 62 and a lever 63 which, in this embodiment of the invention, replace respectively, the curved levers 27 and 29 shown in Fig. 1 to provide a brake rigging that functions substantially the same as the brake rigging shown in Fig. 1. Accordingly, like reference numerals have been used to designate the structure shown in Fig. 2 which is identical with that shown in Fig. 1, and already described. Only such features of the structure and operation of the embodiment of Fig. 2 which differ from that of the embodiment of Fig. 1 will hereinafter be described.

According to the embodiment of the invention shown in Fig. 2, the levers 62 and 63 are respectively provided with slots 64 and 65 and a pair of bores for receiving respectively the pins 44 and 49. These bores are so disposed in the levers 62 and 63 as to be intermediate the respective slots 64 and 65 and the pivotal connections between the levers 62 and 63 and the respective push rods 19 and 20 formed by the pins 26 and 28.

The embodiment of the invention shown in Fig. 2 further differs from the embodiment shown in Fig. 1 in that the fixed clevises 31 and 33 are omitted from the brake beam 3, and the levers 62 and 63 are connected, respectively, as by pins 66 and 67, to a pair of movable or adjustable clevises 68 and 69. The clevis 68 is formed on the upper side of and integral with a first adjustable fulcrum member 70 which has a transverse opening provided with a left-hand thread to receive a left-hand threaded portion 71 formed on the left-hand end of a feed screw 72. The feed screw 72 has a hexagon bolt head 73 formed midway its length to receive a wrench to provide for manual rotation of the feed screw. The left-hand threaded portion 71 of the feed screw 72 extends from the left-hand side of the head 73 through one jaw of a clevis 74, and a right-hand threaded portion 75 extends from the right-hand side of the head 73 through the other jaw of the clevis. The clevis 74 and feed screw 72 may be assembled together by slipping one jaw of the clevis over each of the oppositely extending threaded portions 71 and 75 of the feed screw 72 and into abutting contact with the opposite sides of the hexagon 73 after which the jaws are welded or otherwise secured to an end member 76 forming the base of the clevis 74 which may be then welded to the web of brake beam 3.

The hereinbefore-mentioned clevis 69 is formed on the upper side of and integral with a second adjustable fulcrum member 77 which has a transverse opening provided with a right-hand thread to receive the right-hand threaded portion 75 of the feed screw 72. Each of the adjustable fulcrum members 70 and 77 may be respectively locked in any adjustable position by one of a pair of lock nuts 78 and 79 and a pair of cap screws 80 and 81. The lock nuts 78 and 79 have screw-threaded engagement respectively, with the left-hand threaded portion 71 and the right-hand threaded portion 75 of the feed screw 72 and are tightened respectively, against one side of the fulcrum members 70 and 77 to lock these members to the feed screw.

When a freight car is equipped with a brake rigging of the type described herein, and the brakes are released, the nominal distance between the braking surface of the brake shoes and the tread of the wheels is five-eighths (⅝) of an inch. Therefore, it may be noted that when the brakes are applied, the levers 62 and 63 are rocked about the pins 66 and 67, respectively, from the horizontal position in which they are shown in Fig. 2 through a very small angle. Consequently, the inclination of the levers 62 and 63 with respect to the horizontal, when they occupy their brake applied position is very slight. Furthermore, the force with which the levers 62 and 63 bear against the respective pins 66 and 67 is considerable. Therefore, there is no tendency for the levers to slip with respect to their respective fulcrums as the levers are rocked from the brake released position to their brake applied position.

The cap screws 80 and 81 extend respectively, through slots 82 and 83 formed in the web of the U-channel constituting the brake beam 3 and have screw-threaded engagement with the screw-threaded bores formed respectively, in the fulcrum members 70 and 77. Thus, the lock nuts lock the fulcrum members to the feed screw 72 and the cap screws lock the fulcrum members to the brake beam 3.

In order to adjust the brake rigging shown in Fig. 2 to provide a braking force on the wheels of a car in accordance with the empty or tare weight of the car when the brake rigging is first installed on the car, the lock nuts 78 and 79 and cap screws 80 and 81 are first loosened with a wrench. Then the wrench is applied to the head 73 and the feed screw 72 rotated thereby, whereupon the adjustable fulcrums 70 and 77 are moved toward or away from each other, depending on the direction of rotation of the feed screw 72, until they are moved to a desired position. When the fulcrums 70 and 77 are in the desired position, the distance between pins 44 and 66 when multiplied by the required thrust or force to be transmitted through the rod 36 to the brake beam 4 to provide the proper braking force for the known empty weight of the car is equal to the distance between the pins 26 and 66 multiplied by the thrust or force transmitted from the piston 14 within cylinder 12 through the push rod 19 to the pin 26, and the distance between the pins 49 and 67 when multiplied by the required thrust or force to be transmitted through the rod 38, which is the same as that transmitted through the rod 36, is equal to the distance between the pins 28 and 67 multiplied by the thrust or force transmitted from the piston 14 within the cylinder 13 through the push rod 20 to the pin 28.

From the above it is apparent that, when the empty or tare weight of a car upon which the brake rigging shown in Fig. 2 is to be installed is known, the length of the two arms for each of the levers 62 and 63 can be calculated. Accordingly, when the required length of the two arms of the two levers 62 and 63 has been ascertained, the feed screw 72 can be manually rotated by a wrench applied to the head 73 to move the adjustable fulcrums 70 and 77 to a position to provide the levers 62 and 63 with arms having the required length.

After the adjustable fulcrums 70 and 77 have been moved to the position to provide the levers 62 and 63 with arms having the required length, these fulcrums can be locked in their respective adjusted positions by tightening the lock nuts 78, 79 and cap screws 80, 81.

The operation of the brake rigging comprising the brake mechanism shown in Fig. 2 is substantially the same as the operation of the brake mechanism shown in Fig. 1 differing therefrom, however, in that with the brakes released, the rods 36 and 38 always occupy the position in which they are shown in Fig. 2 regardless of the empty or tare weight of the car on which the brake mechanism is installed and the position of the adjustable fulcrums 70 and 77 on the threaded portions 71 and 75 respectively, of the feed screw 72.

A slack adjuster is not necessary for use with the brake rigging comprising the brake mechanism shown in Fig. 2 for the same reasons as explained previously in connection with the embodiment shown in Fig. 1

Having now described the invention, what I claim as new and desire to secure by Letters Patent, is:

1. A brake rigging for a multi-wheel type of railway vehicle truck having a frame with a longitudinal axis and a transverse axis, said rigging comprising two brake beams extending transversely of and movably supported on the frame of the truck in substantially parallel relation to each other, two brake cylinders carried by one of said brake beams, each cylinder containing slidably disposed therein a piston having a piston rod, a pair of levers each pivotally connected at one end to a corresponding one of said piston rods and at the other end to said one brake beam, and a pair of rods each pivotally connected respectively at one end to a corresponding one of said levers intermediate the ends thereof and at the opposite end to the other of said brake beams.

2. A brake rigging for a multi-wheel type of railway vehicle truck having a frame with a longitudinal axis and a transverse axis, said rigging comprising two brake beams extending transversely of and movably supported on the frame of the truck in substantially parallel relation to each other, two brake cylinders each one of which is carried by a brake beam, each cylinder containing slidably disposed therein a piston having a piston rod, a pair of levers each pivotally connected at one end to a corresponding one of said piston rods and at the other end to the brake beam carrying the corresponding brake cylinder, and a pair of rods each pivotally connected respectively at one end to a corresponding one of said levers intermediate the ends thereof and at the opposite end to the brake beam opposite that on which the corresponding one of said levers is pivoted.

3. A brake rigging for a multi-wheel type of railway vehicle truck having a frame with a longitudinal axis and a transverse axis, said rigging comprising two brake beams extending transversely of and movably supported on the frame of the truck in substantially parallel relation to each other, two brake cylinders carried by one of said brake beams each cylinder containing slidably disposed therein a piston having a piston rod, a pair of levers each having a plurality of holes spaced along the length of the lever and being pivotally connected at one end to a corresponding one of said piston rods and at the other end to said one brake beam, and a pair of rods each pivotally connected respectively at one end in a corresponding one of said plurality of holes in the corresponding one of said pair of levers and at the opposite end to the other of said brake beams.

4. A brake rigging for a multi-wheel type of railway vehicle truck having a frame with a longitudinal axis and a transverse axis, said rigging comprising two brake beams extending transversely of and movably supported on the frame of the truck in substantially parallel relation to each other, two brake cylinders carried by one of said brake beams each cylinder containing slidably disposed therein a piston having a piston rod, a pair of levers each having a plurality of holes in spaced relation along an arc between the ends of the lever, said levers being pivotally connected at one end to a corresponding one of said piston rods and at the other end to said one brake beam, and a pair of rods each selectively pivotally connected at one end in one of said plurality of holes of the corresponding one of said two levers and at the opposite end to the other of said brake beams at a point constituting the center of curvature of said arc.

5. A brake rigging for a multi-wheel type of railway vehicle truck having a frame with a longitudinal axis and a transverse axis, said rigging comprising two brake beams extending transversely of and movably supported on the frame of the truck in substantially parallel relation to each other, two brake cylinders carried by one of said brake beams and each containing slidably disposed therein a piston having a piston rod, a pair of shiftable fulcrum members each carried by said one brake beam, a pair of levers each provided with a slot at one end and pivotally connected at said one end in said slot to one of said fulcrum members and at the other end to one of said piston rods, a pair of rods each pivotally connected respectively at one end to a corresponding one of said levers intermediate the ends thereof and at the opposite end to the other of said brake beams, and manually operable means for shifting said fulcrum members.

6. A brake rigging as claimed in claim 5, further characterized in that the manually operable means is operable to simultaneously and correspondingly shift both of said pair of fulcrum members to correspondingly vary the braking force of both of said brake cylinders.

7. A brake rigging as claimed in claim 5, further comprising means operable to lock said fulcrum members in any position to which they may be shifted by said manually operable means and operable to unlock said fulcrum members to enable shifting thereof by said manually operable means.

8. A brake rigging as claimed in claim 5, further characterized in that said pair of shiftable fulcrum members are respectively provided with a right-hand and a left-hand internal screw-threaded bore and said manually operable means comprises two oppositely extending screw members respectively provided with a right-hand and a left-hand external screw thread each having screw-threaded engagement with the corresponding one of said pair of fulcrum members, and further comprising a pair of lock nuts respectively provided with a right-hand and a left-hand internal screw thread and each carried on the corresponding one of said screw members to lock the corresponding fulcrum member in any position to which it may be shifted by said screw members and to unlock said corresponding fulcrum member to render said corresponding member shiftable by said screw members.

9. A brake rigging for a multi-wheel type of railway vehicle truck having a frame with a longitudinal axis and a transverse axis, said rigging comprising two brake beams extending transversely of and movably supported on the frame of the truck in substantially parallel relation to each other, two brake cylinders carried by one of said brake beams, each cylinder having slidably disposed therein a piston having a piston rod, a pair of levers each having a slot at one end and being pivotally connected at the other end to one of said piston rods for transmitting force from one of said piston rods to the other of said brake beams, an internally threaded shiftable fulcrum member for each of said levers, each fulcrum member being carried by said one brake beam and pivotally connected to its respective lever through the intermediary of the slot therein, and manually operable rotatable means carried on said one brake beam and provided with right-hand and left-hand threaded portions with which said fulcrum members respectively have a screw-threaded connection whereby said fulcrum members can be shifted toward or away from each other according to the direction of rotation of said rotatable means to vary the force transmitted by the respective piston rods through the respective one of said levers to said one brake beam.

10. A brake rigging, as claimed in claim 9, further comprising means for rotatably mounting said rotatable means on said one brake beam.

11. A brake rigging as claimed in claim 5, further characterized in that said one brake beam is provided with a pair of spaced-apart elongated slots and including screw means extending respectively through a corresponding one of the elongated slots in said one brake beam and cooperating with each of said fulcrum members for locking said fulcrum members in desired positions on said one brake beam.

12. A brake rigging for a multi-wheel type of railway vehicle truck having a frame with a longitudinal axis and a transverse axis, said rigging comprising two brake beams extending transversely of and movably supported on the frame of the truck in substantially parallel relation to each other, a brake cylinder carried by one of said brake beams, a piston contained and slidably operable in said cylinder responsive to the supply of fluid under pressure to and release of fluid under pressure from the said cylinder, said piston having a piston rod, a lever pivotally connected at one end to said piston road and at the other end to said one brake beam, and a rod pivotally connected respectively, at one end to said lever intermediate the ends thereof and at the opposite end to the other of said brake beams.

References Cited in the file of this patent

UNITED STATES PATENTS

| | | |
|---|---|---|
| 363,777 | Teller | May 24, 1887 |
| 458,584 | Knight | Sept. 1, 1891 |
| 902,172 | Sarvent | Oct. 27, 1908 |
| 1,002,433 | Oliver et al. | Sept. 5, 1911 |
| 1,762,586 | Priebe | June 10, 1930 |